Patented Apr. 6, 1926.

1,579,716

UNITED STATES PATENT OFFICE.

OTTO J. KUHLKE, OF AKRON, OHIO, ASSIGNOR TO THE KUHLKE MACHINE COMPANY, OF AKRON, OHIO, A CORPORATION OF OHIO.

VULCANIZER.

Application filed October 6, 1923. Serial No. 666,877.

*To all whom it may concern:*

Be it known that I, OTTO J. KUHLKE, a citizen of the United States, and a resident of Akron, county of Summit, State of Ohio, have invented certain new and useful Improvements in Vulcanizers, of which the following is a specification.

This invention relates to apparatus for use in the vulcanization of articles of rubber or rubber and fabric and while it is adapted for general use, it is here shown as designed and intended for the vulcanization of tire flaps such as used in the casings of pneumatic tires.

The object of the invention is to improve upon apparatus previously in general use for this purpose, to enable the flap to be manufactured more efficiently, to obtain better results and to improve the manufacture of these articles by obtaining even pressure throughout the flap, eliminating waste, trimming and other disadvantages in present methods of molding flaps.

In the drawings is shown one embodiment of the invention, it being understood that such showing is illustrative merely and that other forms and modifications may be designed for accomplishing the purposes of the invention.

Figure 1:
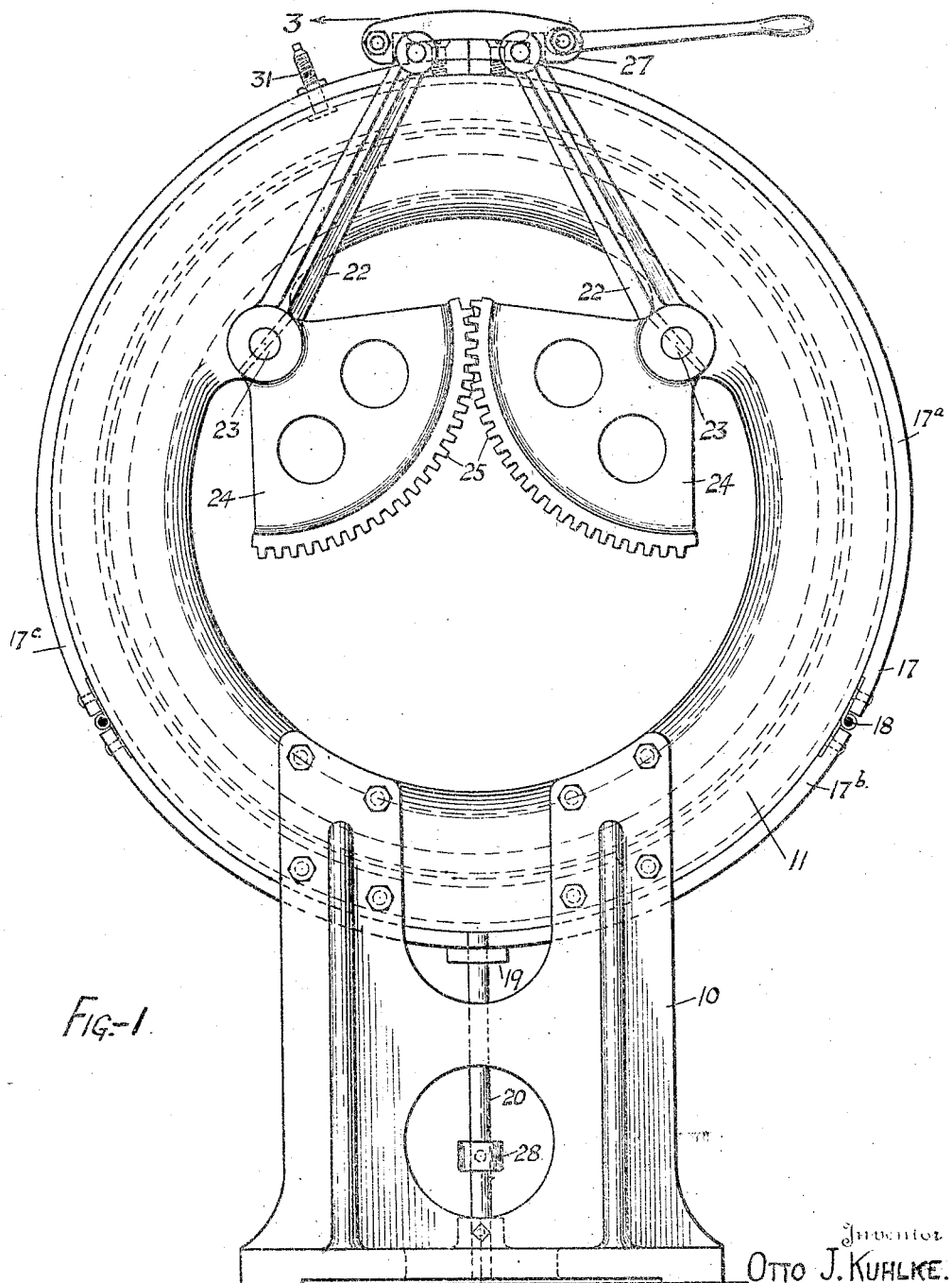
Figure 1 is a side elevation of the vulcanizer in closed position, or in the position in which it is used during the vulcanization of the article.

In the drawings the vulcanizer is supported upon a stand or bracket 10 which is of suitable height and to the upper end of which is fastened the hollow, steam heated form or mold 11, the chamber 12 of which is designed to receive a heating medium such as steam introduced and circulated through pipe openings 13.

The form is shown as circular, although it will be understood that such shape is not essential and may be modified to other forms. Its outer surface is provided with a cavity 14, the cross section of which is shown as designed to mold a tire flap, although other shapes may be given to the cavity to form other articles. The tire flap, which is formed of rubber or rubber and fabric, is designated by the numeral 16.

Around the outside of the mold is arranged the jacket 17 which is preferably in three arc-shaped segments or sections, $17^a$, $17^b$ and $17^c$, the section $17^a$ being connected to the adjacent sections by hinges 18. The section $17^b$ is provided at its lowermost point with a plate 19 which is slidably received over a post or side pin 20 projecting upwardly from the base 10.

At their upper ends the sections $17^a$ and $17^c$ are provided with lugs 21 to which are pivoted arms 22 that are journaled at opposite points 23 on the inner circumference of the mold. With the arms are formed angular continuations 24 which are in the form of intermeshing gear segments 25. One of the shafts 23 is extended to the opposite side of the mold and is provided with an operating hand lever 26. When the hand lever is rocked so as to bring the jacket into the position shown in Figure 1, the jacket closely surrounds the outside of the mold and may be secured in that position by any suitable form of clamping plate or lock, illustrated in this application as the lock 27.

Figure 2:
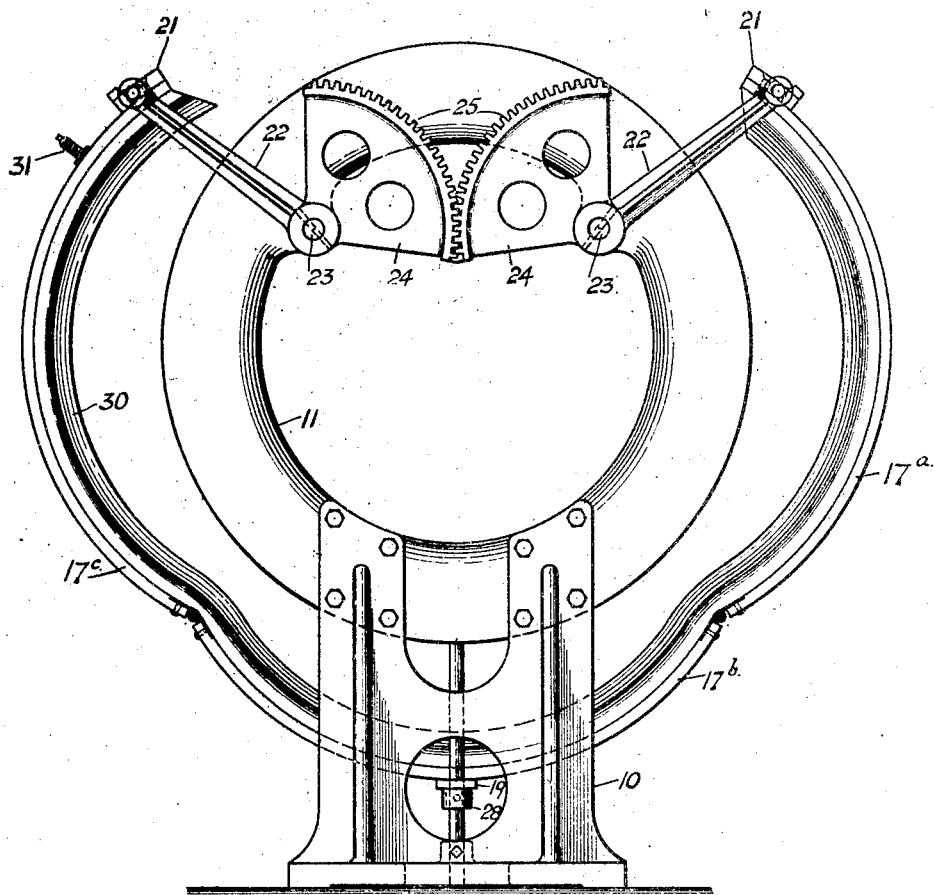
Figure 2 is a similar view with the vulcanizer opened to remove the cured article and to refill.
Figure 3:
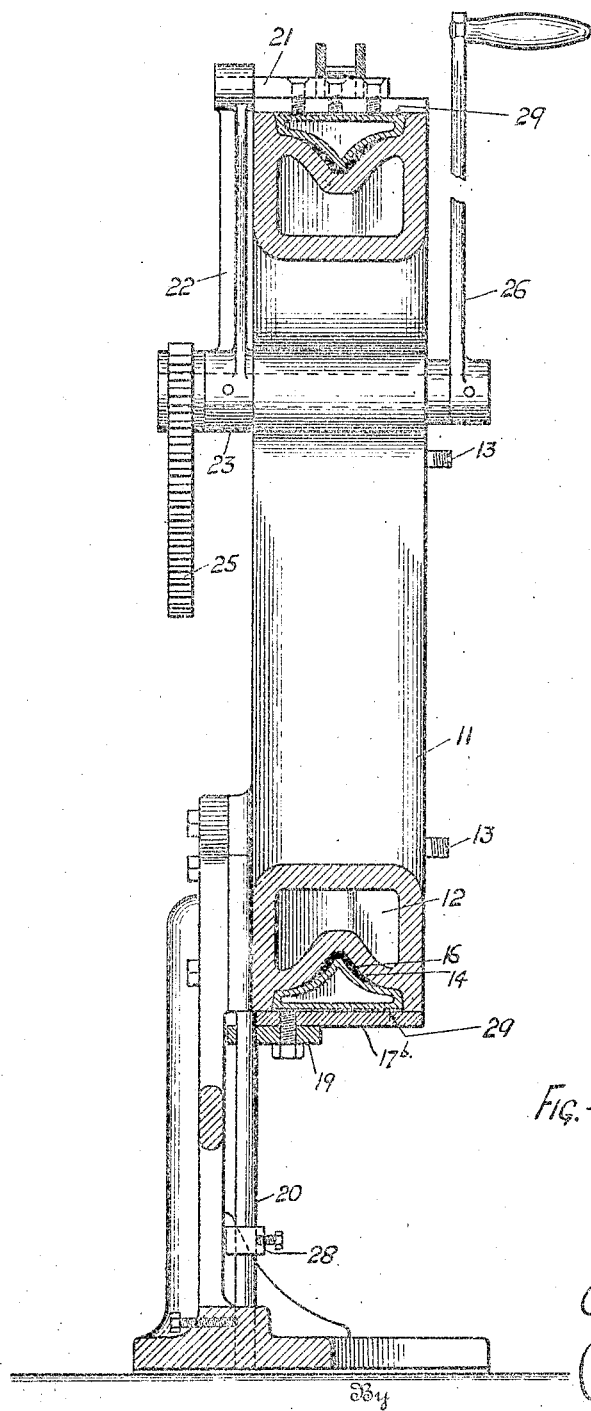
Figure 3 is a vertical section on the line 3—3 of Figure 1.

When the hand lever is rocked, the two arms 22 move apart in unison until they reach the position shown in Figure 2, at which point the jacket or cover is opened and lowered away from the form which is thus left open around its entire circumference on one side so that it is readily accessible to the workman. The jacket is maintained in open position by means of any suitable stop. I have shown here an adjustable collar 28 on the post 20 on which the jacket will rest when in expanded position.

In order to shape the tire flap, or other material to be vulcanized, I prefer to employ an expansible air bag 30 which is fastened to the inside of the jacket, the ends of the air bag being preferably formed on a bevel so as to overlap, the construction being indicated in Figure 2. The air bag may be made in any well known manner of rubber or rubber and fabric. The air bag may be inflated through a suitable valve 31 and is attached to the jacket in any manner so that it is permanently located thereon. A strip of fabric 29 may be interposed between the bag and the jacket by means of which the bag is secured in position.

The operation of the device is as follows:

The mold being open as shown in Figure 2, the operator lays within the mold the material which is to be vulcanized, either in an endless band or split at one point. The jacket is then closed by the operation of the hand lever and clamped together. The air bag is inflated and the material vulcanized by the heat circulated through the mold. After being cured, the apparatus is opened up and the cured material removed.

It is obvious that the invention is not necessarily limited to exact conformance with the details as have been shown and described, but may be varied within the scope of the claims as setting forth the invention. Modifications and adaptations of the invention would suggest themselves to those skilled in the art without departure from the essential features of the invention.

What I claim is:

1. In an apparatus of the character described, the combination of a mold, a jacket to surround the outer circumference of the mold, the jacket being hinged to expand and contract, and mechanism connected to the mold and to the jacket to move it to expanded condition.

2. In an apparatus of the character described, the combination of a mold having a vulcanizing cavity therein, a hinged jacket surrounding the mold, and mechanism connected with the jacket to expand and move it outwardly from encircling position about the entire circumference of the mold.

3. In an apparatus of the character described, the combination of a mold having a vulcanizing cavity about its circumference, a hinged jacket surrounding the mold, and means connected with the two ends of the jacket to expand and move them outwardly from their position about the entire circumference of the mold and to restore them to clamping position.

4. In an apparatus of the character described, the combination of a mold having a vulcanizing cavity therein, a multiple piece jacket hinged together and adapted to surround the mold, and lever mechanism connected to opposite points on the jacket and adapted to expand and contract the jacket and shift its position with respect to the mold.

5. In an apparatus of the character described, the combination of a form having a grooved vulcanizing surface on its periphery, a jacket comprising a plurality of segments, and means to expand the jacket and simultaneously therewith to remove it from contact with the form.

6. In an apparatus of the character described, the combination of a vertical form having a grooved vulcanizing cavity on its periphery, a segmental jacket, means to expand the jacket and simultaneously therewith to remove it from contact with the form, and means to heat the material held between the form and the jacket.

7. In an apparatus of the character described, the combination of a circular mold, means to heat the material within the mold, an expansible jacket surrounding the mold, and means to expand the jacket and support it in expanded condition out of contact with the mold.

8. In an apparatus of the character described, the combination of a circular mold, means to heat the mold, an expansible jacket surrounding the mold, and means connected to the jacket and to the mold to expand the jacket.

9. In an apparatus of the character described, the combination of a stationary mold, a cover for the mold constructed in a plurality of segments hingedly connected together but separable at its ends, levers connected to the ends of the cover, and gearing to move said levers in unison, the levers being pivoted upon the mold in position to expand and contract the cover.

10. In a vulcanizer, a stationary circular mold, means for heating the mold, the mold having a vulcanizing surface on its outer periphery, a jacket constructed in a plurality of segments hingedly connected together but separable at its ends, levers connected to the ends of the cover and pivoted on the mold, and intermeshing gearing connecting said levers for unitary movement toward and away from the mold.

11. An apparatus for curing endless tire flaps which are substantially V-shaped in cross section, the apparatus comprising a central circular form having a groove therein in which the flap is vulcanized, a sectional jacket surrounding the form and having a projecting formation adapted to enter the groove, means to heat the apparatus to vulcanize the flap, means to expand the jacket and simultaneously therewith to remove it from contact with the form, and means to subject the flap to fluid pressure during the vulcanizing process.

12. In a vulcanizing apparatus, a stationary mold having a vulcanizing surface thereon, a hinged expansible jacket about the mold, and an expansible pressure chamber permanently attached to the inner circumference of the jacket.

13. In a vulcanizing apparatus, a stationary mold having a vulcanizing surface thereon, a hinged expansible jacket having lever mechanism to operate it connected to the mold, and a fluid expansible chamber carried by the jacket and movable therewith toward and away from the mold.

14. In a vulcanizing apparatus, a stationary mold having a vulcanizing surface thereon, a hinged expansible jacket having lever mechanism to open it and support it in open position spaced from the mold, and a fluid expansible chamber carried by the jacket and movable therewith toward and away from the mold.

15. In a vulcanizing apparatus, a mold, a jacket surrounding the mold, the jacket being expansible toward and away from the mold, lever mechanism to expand the jacket and support it in spaced relation about the mold, and a fluid expansible chamber associated with the said apparatus to exert pressure upon the object being molded therein.

16. In a vulcanizing apparatus for the manufacture of tire flaps, an inner ring-shaped member having a substantially V-shaped cavity therein, an outer member adapted to surround the other member and having a projecting surface thereon adapted to be received within the cavity, one of said members being formed in parts so as to permit placement and removal of the tire flap, and means to open last named member and simultaneously therewith to remove it from contact with the other.

17. In a vulcanizing apparatus for the manufacture of tire flaps, an inner ring-shaped member having a substantially V-shaped cavity therein, an outer member adapted to surround the other member and having a projecting surface thereon adapted to be received within the cavity, one of said members being formed in parts, means to open the last named member and remove it from contact with the other so as to permit placement and removal of the tire flap, and means to subject the material confined between the members to fluid pressure during the curing operation.

18. In an apparatus of the character described, the combination of a mold having a vulcanizing cavity about its outer circumference, a hinged jacket surrounding the mold and adapted to part at a single point, a clamping device to hold the ends of the jacket together during the vulcanizing operation, and mechanism associated with the jacket for simultaneously opening the jacket and moving it away from the mold about the entire circumference thereof.

19. In an apparatus of the character described, the combination of a mold having a vulcanizing cavity about its outer circumference, a hinged jacket surrounding the mold and adapted to part at a single point, and mechanism associated with the jacket for opening the jacket and moving it away from the mold about the entire circumference thereof.

20. In an apparatus of the character described, the combination of a vertical mold having a vulcanizing cavity about its outer circumference, a sectional jacket surrounding the mold, and means to open the jacket and lower it away from the mold so that it is out of contact therewith.

OTTO J. KUHLKE.